United States Patent [19]
Platus et al.

[11] Patent Number: 5,833,204
[45] Date of Patent: *Nov. 10, 1998

[54] RADIAL FLEXTURES, BEAM-COLUMNS AND TILT ISOLATION FOR A VIBRATION ISOLATION SYSTEM

[75] Inventors: David L. Platus, Los Angeles; Donald A. Durran, Manhattan Beach, both of Calif.

[73] Assignee: Minus K Technology, Inc., Inglewood, Calif.

[*] Notice: The term of this patent shall not extend beyond the expiration date of Pat. No. 5,669,594.

[21] Appl. No.: 819,146

[22] Filed: Mar. 17, 1997

Related U.S. Application Data

[63] Continuation-in-part of Ser. No. 434,979, May 3, 1995, Pat. No. 5,669,594, which is a continuation of Ser. No. 186,573, Jan. 25, 1994, abandoned, which is a continuation-in-part of Ser. No. 125,496, Sep. 22, 1993, abandoned, which is a continuation of Ser. No. 987,046, Dec. 4, 1992, abandoned, which is a continuation-in-part of Ser. No. 708,995, May 31, 1991, Pat. No. 5,178,357, which is a continuation-in-part of Ser. No. 681,808, Apr. 8, 1991, abandoned, which is a continuation-in-part of Ser. No. 395,093, Aug. 16, 1989, abandoned.

[51] Int. Cl.⁶ .................................................. F16M 13/00
[52] U.S. Cl. .......................................... 248/619; 248/638
[58] Field of Search .................................... 248/619, 620, 248/621, 623, 603, 632, 638, 678; 267/140.5, 36.1

[56] References Cited

U.S. PATENT DOCUMENTS

| | | | |
|---|---|---|---|
| 2,942,420 | 2/1960 | Fink | 248/632 X |
| 3,223,400 | 12/1965 | Deister, Jr. | 248/619 X |
| 4,223,762 | 9/1980 | Gertal | 248/621 X |
| 4,789,023 | 12/1988 | Grant | 248/619 |
| 4,871,142 | 10/1989 | DeMey, II | 248/632 |
| 5,040,764 | 8/1991 | Dubois | 248/638 X |
| 5,178,357 | 1/1993 | Platus | 248/619 |
| 5,310,157 | 5/1994 | Platus | 248/619 |
| 5,370,352 | 12/1994 | Platus | 248/619 |
| 5,390,892 | 2/1995 | Platus | 248/619 |
| 5,669,594 | 9/1997 | Platus et al. | 248/619 |

*Primary Examiner*—Ramon O. Ramirez
*Attorney, Agent, or Firm*—Fulwider, Patton Lee & Utecht LLP.

[57] ABSTRACT

The present invention provides improvements in the design of radial flexures and beam-columns used in vibration isolation systems which rely on a principle of loading a particular elastic structure which forms the isolator or a portion of it to approach the elastic structure's point of elastic instability. The improved radial flexure includes a region along the flexure in which there is reduced stiffness than the stiffness substantially along the length of the flexure. In one preferred form of the invention, the region of reduced stiffness is created by machining or forming a notch near each end of the flexure. Likewise, the improved design of the beam-column includes a region in which the stiffness of the beam-column in less than the stiffness along substantially the length of the beam-column. In one preferred embodiment, the region of reduced stiffness of the beam-column is formed by machining or otherwise forming notches near the ends of the beam-column. Those regions of reduced stiffness provide the necessary bending flexibility of the beam-column and radial flexure while increasing their local crippling strengths. The present invention is also directed to an improved tilt-motion isolator which utilizes a single damper pad or a plurality of damper pads to provide tilt isolation on an isolator which includes vertical and/or horizontal motion isolation. An outer stiffening jacket which increases the initial stiffness of the beam-column can be incorporated for applications in which the initial stiffness of the beam-column must be increased, or to provide a simple method for changing the stiffness of the beam-column.

14 Claims, 4 Drawing Sheets

RADIAL FLEXTURES, BEAM-COLUMNS AND TILT ISOLATION FOR A VIBRATION ISOLATION SYSTEM

This application is a continuation-in-part of application Ser. No. 08/434,979 filed May 3, 1995, now U.S. Pat. No. 5,669,594, which is a continuation of application Ser. No. 08/186,573 filed on Jan. 25, 1994, now abn. which is a continuation-in-part of application Ser. No. 08/125,496 filed Sep. 22, 1993, now abn. which is a continuation of application Ser. No. 07/987,046 filed Dec. 4, 1992 entitled "VIBRATION ISOLATION SYSTEM", now abn., which is a continuation-in-part of application Ser. No. 07/708,995, filed May 31, 1991, entitled "Vibration Isolation System", now U.S. Pat. No. 5,178,357, which is a continuation-in-part of application Ser. No. 07/681,808, filed Apr. 8, 1991, now abn., entitled "DAMPED VIBRATION ISOLATION SYSTEM", which is a continuation-in-part of application Ser. No. 395,093, filed Aug. 16, 1989, entitled "VIBRATION ISOLATION SYSTEM", now abn.

BACKGROUND OF THE INVENTION

1. Field of the Invention

This invention relates generally to suspension systems and methods for isolating and reducing the transmission of vibratory motion between an object and a base and, more particularly, to improvements in the design of radial flexures used in conjunction with axial-motion isolators and beam-columns used in transverse-motion isolators which rely on a principle of loading a particular elastic structure which forms the isolator or a portion of it (the loading being applied by either the supported weight or by an external loading mechanism) to approach the elastic structure's point of elastic instability. Such isolators which rely on this principle of operation are shown and described in U.S. Pat. Nos. 5,310,157, 5,370,352, 5,178,357, 5,390,892, and 5,549,270 which are all hereby incorporated by reference. These vibration isolators exhibit low stiffness, high damping to limit resonant responses of the composite system, effective isolation at the higher frequencies, and can provide high isolator resonant frequencies. The present invention also relates to improvements to a tilt-motion isolator which can be in conjunction with the axial-motion and transverse-motion isolators to provide effective six-degree-of-freedom isolation (translation and rotation in all directions).

2. Description of Related Art

The problems caused by unwanted vibration on equipment, devices and processes that are extremely motion sensitive have been widely researched and numerous solutions to prevent or reduce the transmission of vibratory motion have been proposed and developed. Many of the devices designed to reduce the transmission of unwanted vibration between an object and its surroundings, commonly called vibration isolators or suspension devices, have utilized various combinations of elements such as resilient pads made from a variety of materials, various types of mechanical springs, and pneumatic devices. There are, however, shortcomings and disadvantages associated with these particular prior art isolation systems which prevent them from obtaining low system natural frequencies and from limiting resonant responses to low values while providing high isolation performance at the higher frequencies.

These shortcomings and disadvantages of prior art systems were addressed through the development of the novel vibration isolation systems and novel devices and methods for retro-fitting existing vibration isolation systems which are described in the above-identified U.S. patents and our co-pending application Ser. No. 08/434,979 filed May 3, 1995 which is also hereby incorporated by reference. The particular vibration isolation systems described in these patents and our co-pending application, and utilized in connection with the present invention, provide versatile vibration isolation by exhibiting low stiffness in an axial direction (generally the direction of the payload weight) and any direction substantially transverse to the axial direction (generally a horizontal direction), and may provide tilt or rotation about three mutually perpendicular axes. The particular system utilizes a combination of uni-directional or bi-directional isolator subassemblies that can be connected together in series fashion to provide omni-directional isolation. Each isolator is designed to isolate the axial or the transverse component of any vibratory translation to effectively isolate vibrations along or about any directional axes. In subsequent discussions, an axial-motion isolator will be referred to as a vertical-motion isolator, and the system of axial-motion isolators will be referred to as the vertical-motion isolation system. Similarly, a transverse-motion isolator will be referred to as a horizontal-motion isolator, and the system of transverse-motion isolators will be referred to as the horizontal-motion isolation system. Lastly, a tilt-motion isolator in conjunction with a structure allowing rotation about the tilt axes will be referred to as the tilt-motion isolation system. The tilt axes are transverse to the axial direction and usually lie in the horizontal plane.

In the embodiments described in the above-noted patents and our co-pending application, the isolator relies on a particular principle of loading a particular elastic structure which forms the isolator or a portion of it (the loading being applied by either the supported weight or by an external loading mechanism) to approach the elastic structure's point of elastic instability. This loading to approach the point of elastic instability, also called the "critical buckling load" of the structure, causes a substantial reduction of either the vertical or the horizontal stiffness of the isolator to create an isolation system that has low stiffness in the vertical and in any horizontal direction, and increases the damping inherent in the structure. While stiffness is reduced, these isolators still retain the ability to support the payload weight.

If the load on an elastic structure with an instability is greater than the critical buckling load, the excessive load will tend to propel the structure into its buckled shape, creating a "negative-stiffness" or "negative-spring-rate" mechanism. By combining a negative-stiffness mechanism with a spring, adjusted so that the negative stiffness cancels or nearly cancels the positive stiffness of the spring, one obtains a device that can be placed at or near its point of elastic instability. The magnitude of the load causing the negative stiffness can be adjusted, creating an isolator that can be "fine tuned" to the particular stiffness desired.

SUMMARY OF THE INVENTION

The present invention provides novel and significant improvements in the design of radial flexures used in conjunction with the negative-stiffness mechanism found on vertical-motion isolators. The improvements relate to providing bending or rotational flexibility substantially concentrated near the ends and having relatively high stiffness in the center region of the flexure. The particular flexure provides additional advantages and greater design versatility than a flexure having relatively constant thickness. Since the negative-stiffness mechanism used in conjunction with the vertical-motion isolator adds initial stiffness to the support springs of the isolator, its stiffness, along with the stiffness of the support springs must be canceled to approach the isolator's point of elastic instability. In one preferred embodiment, notches are machined or otherwise formed near the ends of the flexures. The use of a notched radial flexure allows the initial flexure stiffness to be made lower so that less negative stiffness is required to cancel the positive stiffnesses of the support spring and the negative-stiffness mechanism in order to produce the low natural frequency exhibited by the isolator. This feature makes it easier to achieve lower natural frequencies compared to a flexure having a constant, or near constant, thickness. The notched radial flexure also results in less sensitivity of the natural frequencies of the isolator to displacements from the equilibrium position and to other factors such as temperature change, creep of the support springs, and dimensional tolerances during manufacture.

The benefits of using a notched radial flexure can be explained as follows, namely, compressive load on the radial flexures results in the so called "beam-column" effect so that the bending stiffness of the radial flexure is reduced. This is equivalent to adding negative stiffness to the initial flexure bending stiffness. When the critical buckling load is reached, all of the flexure bending has been removed. When the compressive load exceeds the critical buckling load, the flexures become a negative stiffness mechanism which removes stiffness from the support springs upon application of additional compressive force. The greater the compressive force, the more stiffness can be removed from the support springs. However, there is a limit to the compressive loading that can be applied to the flexures since at sufficiently high loads, the flexures will buckle into a different buckling mode (referred to as a local crippling mode) than the mode in which the isolator is designed to operate. This buckling of the flexures into the local crippling mode is highly undesirable during the operation of the isolator. A notched flexure, however, raises the critical load for this local crippling mode compared with a constant-thickness flexure so that more negative stiffness can be produced by the notched flexure which has a lower initial stiffness. As a result, application of additional compressive load on the notched flexure should not propel it into the local crippling mode, as may occur when using a constant-thickness flexure. Moreover, since the notched flexures have lower initial stiffness, less compressive load is required to remove the positive stiffness of the support springs and the capacity of the spring to provide this compressive load is lower than that of constant-thickness flexures.

Similar features can be achieved in a horizontal-motion isolator which relies on the principle of loading beam-columns (the loading being applied by the supported weight) to approach the beam-column's point of elastic instability by utilizing a beam-column having bending or rotational flexibilities substantially concentrated near the ends and having relatively high stiffness in the center region of the beam-column. In one particular embodiment of the invention, notches are formed near each end to vary the thickness of the column along its length. The notches near the ends of the beam-column provide the necessary bending flexibility and also result in a higher crippling load for the local crippling mode. This is important when an isolator is stiffened in tilt to handle the redistribution of loads resulting from displacement of stages, for example, in a semiconductor metrology tool or a coordinate measurement machine. This redistribution results in higher load on some beam-columns and lower load on other beam-columns. The higher crippling load is also important when preloaded pairs of beam-columns are used as described in U.S. Pat. No. 5,390,892 to accommodate changes in weight load without undesirable variations in horizontal stiffness and horizontal natural frequencies.

The present invention is also directed to a device for adding stiffness to the beam-columns in the event that the initial stiffness of the column is too low for a given application. In one preferred embodiment of this present invention, an outer stiffening jacket is placed around the outer surface of the beam-column to add the desired amount of stiffness. The desired stiffness can be attained by varying the selection of materials making up this outer jacket, along with variations in the size and shape of the components making up this outer jacket, as well as the location of the jacket on the beam-column.

The present invention also relates to improvements to a tilt-motion isolator which can be used in conjunction with the vertical-motion and horizontal-motion isolators to provide six-degree-of-freedom isolation (translation and rotation in all directions). In a preferred embodiment, a damper pad is utilized to provide a simple and economical means for obtaining damped tilt stiffness capability. With sufficient damping, the tilt-motion isolator will accommodate significant horizontal-tilt coupling so that in many cases it is not necessary to use a weighted platform to decouple horizontal and tilt motions, as described in co-pending application Ser. No. 08/434,979. Additionally, the use of a damper pad creates a more compact design by using less vertical space, adding to design flexibility and versatility. The damper pad helps eliminate the effects of high frequencies on the isolator system as well. It is also possible to vary the stiffness and damping by utilizing a plurality of pads to achieve the desire range of stiffness and damping. Additionally, variations in the size, shape, and material make-up of these damper pads can provide a wide range of stiffnesses and damping as may be required.

DETAILED DESCRIPTION OF THE PREFERRED EMBODIMENT

Figure 1:
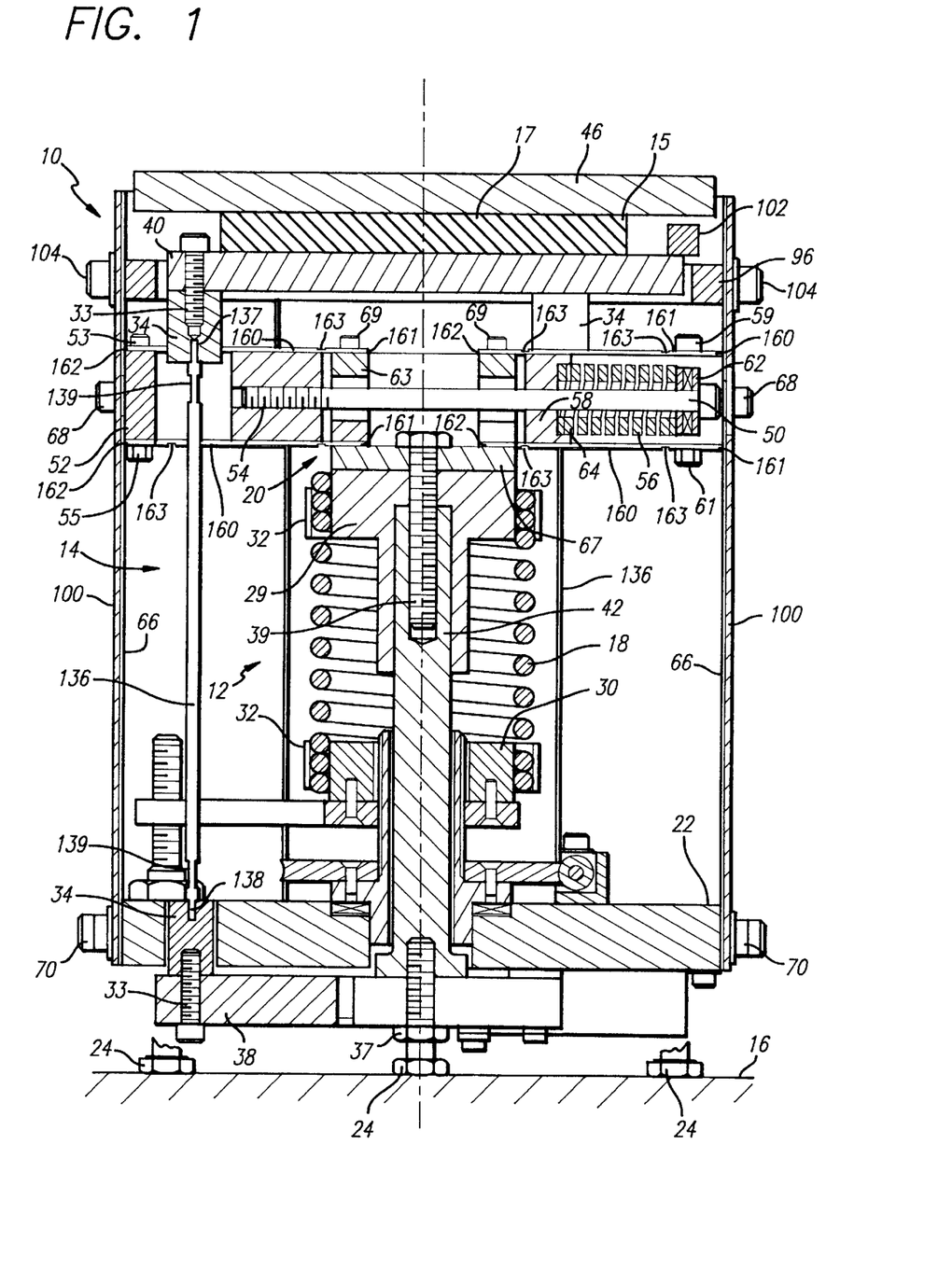
FIG. 1 is a partial cross-sectional side view of a single composite six degrees-of-freedom vibration isolator which embodies features of the present invention.

As shown in the drawings for purposes of illustration, particular elements embodying the improvements of the present invention are found on one particular embodiment of a composite isolator as shown in FIG. 1. As the present invention is described in detail as applied to the particular isolator shown in FIG. 1, those skilled in the art will appreciate that these improvements can also be used in conjunction with other isolators as well.

As in the composite isolator described in our co-pending application Ser. No. 08/434,979, FIG. 1 shows an isolator 10 comprises a vertical-motion isolator 12 operatively connected vertically in series with a horizontal-motion isolator 14 which is operatively connected vertically in series with a tilt-motion isolator 15. The vertical-motion, horizontal-motion and tilt-motion isolators are arranged in the same general configuration as shown and described in our above-referenced co-pending application. Since certain structural elements shown in the isolator of our co-pending application are not necessary to understand the structural improvements of the present invention, only brief mention will be made to these elements in the present application. Reference should be made to our co-pending application for a thorough understanding and description of the operation and structure of this isolator. Whenever possible, the same reference numerals are used to designate elements in the present application which correspond to like elements in our co-pending application.

The embodiment of a single composite 6-DOF isolator 10 of FIG. 1 is designed to support a payload (not shown) relative to a foundation 16 to reduce the transmission of omnidirectional vibrations between the payload and foundation.

The vertical-motion isolator 12 of the present invention includes a support spring 18 in the form of a coil spring that operatively connects between a center hub assembly 20 and a base plate 22 that is connected to the foundation 16 by three leveling screws 24. The center hub assembly 20 comprises a center block 63, a center plate 67 and the upper spring support 29, clamped together with screws 69 and 39. A negative-stiffness mechanism also connects to the center hub assembly 20 to cancel stiffness from the support spring 18, and includes radially-compressed flexures 160. Clamps 32 secure the support spring 18 to the upper spring support 29 and to a lower spring support 30.

The horizontal-motion isolator 14 comprises three flexible beam-columns 136 (only two of which are shown in FIG. 1) in the form of thin cylindrical rods that are operatively connected between a lower column plate 38 and an upper column plate 40. In the embodiment of FIG. 1, each beam-column 136 has a first end 137 and a second end 138 which are press-fit into end fittings 34 which are attached to the upper column plate 40 and to the lower column plate 38 with screws 33. As can be seen in FIG. 1, the beam-column 136 has a pair of notches 139 machined or otherwise formed therein near the first and second ends 137 and 138. The lower column plate 38 connects to a stiff support shaft 42 with screw 37. The support shaft 42 is connected with screw 39 to the upper spring support 29 and to the center plate 67 which are part of the center hub assembly 20, thereby providing a relatively rigid connection between the top of the vertical-motion isolator and the bottom of the horizontal-motion isolator.

The upper column plate 40 which is the top of the horizontal-motion isolator connects to a top mounting plate 46 through the tilt-motion isolator 15. In the embodiment of FIG. 1, the tilt-motion isolator 15 is made from a damper pad 17 which provides a simple and economical means for providing tilt stiffness capability to the isolator 10. The damper pad 17 also provides for more compact design by using less vertical space than the flexure assembly which acts as the tilt-motion isolator in our above-referenced co-pending application. The tilt-motion isolator of the present invention eliminates the need for the various components forming the tilt flexure assembly without compromising the performance of the isolator.

An isolator cover comprises four cover panels 100 (only two of which are shown) and four corner panels (not shown) that attach to the base plate 22 with screws 70. A stop plate 96 also attaches to the cover panels 100 and corner panels with screws 104 and serves as the down-motion stop with three motion stops 102 spaced 120 degrees and attached to upper column plate 40 with screws. The motion stops 102 also serve as tilt-motion stops to limit tilt of the top mounting plate 46 with respect to the upper column plate 40.

Figure 2:
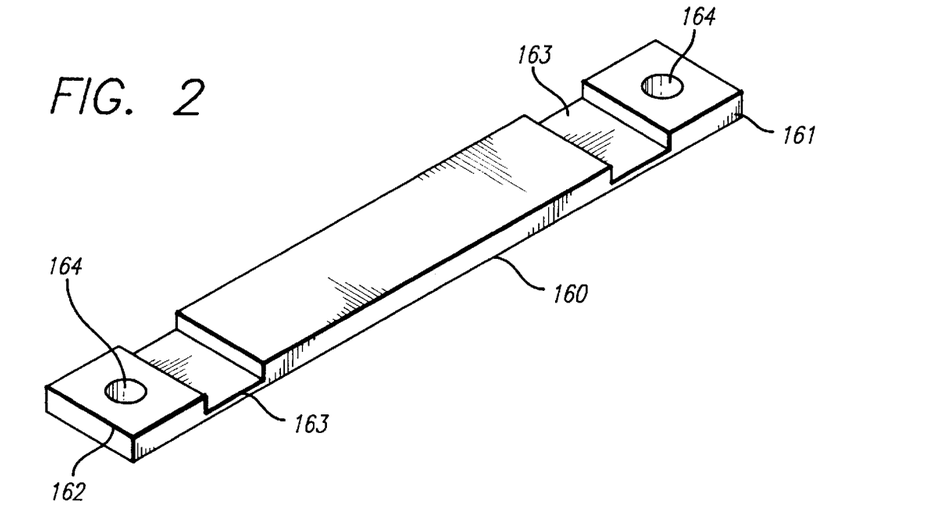
FIG. 2 is a perspective view of an improved notched radial flexure embodying features of the present invention.
Figure 3:
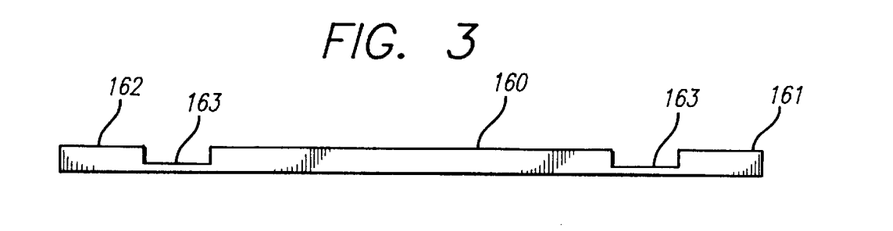
FIG. 3 is an elevational view of the notched radial shown in FIG. 2.

Four notched radial flexures 160 are attached to a load block 52, the center hub assembly 20 and spring block 58 and are compressed using a tension screw 50 and die spring 56. Each flexure 160 has a first end 161 and a second end 162 with a notch 163 machined or otherwise formed in close proximity to these first and second ends 161 and 162. FIGS. 2 and 3 show in greater detail the particular novel structure of the notched flexure 160 used in accordance with the present invention.

Referring specifically now to FIGS. 2 and 3, the notched flexure 160 is shown having first and second ends 161 and 162 with the pair of notches 163 machined or otherwise formed into the flexure 160. The first end 161 includes an opening 164 for receiving a bolt or other fastening means. Likewise, the second end 162 includes an opening 164 for receiving a fastener as well. Although not shown, the notches 163 would include a fillet in each corner of the notch to help prevent stress concentrating from occurring during use.

Figures 4, 5:
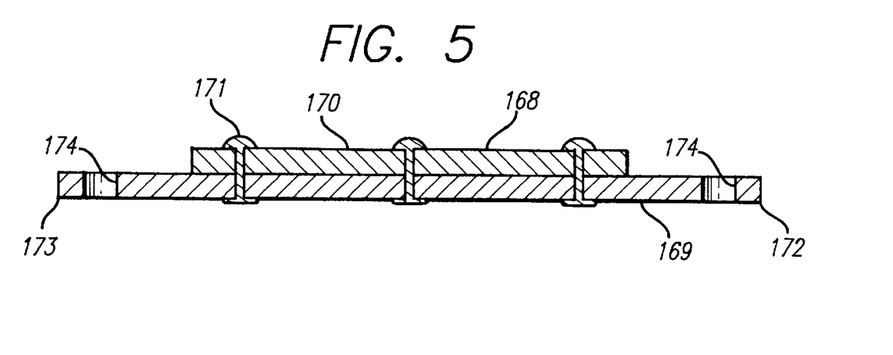
FIG. 4 is an elevational view of another embodiment of a notched radial flexure embodying features of the present invention.
FIG. 5 is a cross-sectional elevational view of another embodiment of a notched radial flexure embodying features of the present invention.

Referring now to FIG. 4, another embodiment of the notched radial flexure 165 is shown. In this particular embodiment, the flexure 165 includes a first end 166 and a second end 167. Although not shown in FIG. 4, openings in each of these first and second ends 165 and 166 allow the flexure 165 to be fastened to the negative stiffness mechanism using, for example, a screw and a nut plate. This flexure 165 and the attachment means provide an effective notch near the first and second ends 166 and 167 in that there is a transition region in which the flexure has a reduction in its thickness near the first and second ends 166 and 167 and the attachment means clamps only part of these reduced thickness ends. This particular embodiment of the radial flexure 165 is substantially similar to the flexure 160 shown in FIGS. 2 and 3 except that the ends 166 and 167 do not have a shoulder region as is shown in the embodiment in FIGS. 2 and 3. However, this particular radial flexure 165 with its appropriate attachment means performs in substantially the same fashion as the radial flexure 160.

Referring now to FIG. 5, another embodiment of a radial flexure 168 is shown as a two-layer flexure which, with an appropriate attachment means, also performs substantially the same function as the embodiments shown in FIGS. 2 through 4. This radial flexure 168 includes a bottom plate 169 which is attached to a top plate 170 by rivets 171 or other suitable fastening means. As is shown in FIG. 5, the top plate 170 does not extend the entire length as the bottom plate 169 in order to create a composite flexure which, as with the counterparts shown in FIGS. 2 through 4, create a flexure having varying thicknesses in order to achieve the above-noted benefits associated with such a structure. The bottom plate 169 includes a first end 172 and second end 173 which is connected to the negative stiffness mechanism. Openings 174 are located in each of the first and second ends 172 and 173 to receive a bolt or other suitable fastening means for attaching the flexure 168 to the negative stiffness mechanism. Again, since the flexure has a composite thickness which varies from a wider thickness in the middle to a thinner thickness near each of its ends, this particular structure acts in much the same way as the notched flexure shown in FIG. 2.

Referring back to FIG. 1, the ends 161 of flexures 160 are attached to the load block 52 using with bolts 53 and nuts 55 and they are attached to spring block 58 again using bolts 59 and nuts 61 or similar fastening components. The other ends are fastened to the center hub with fasteners such as screws 69. The threaded end 54 of tension screw 50 screws into load block 52 and the head of screw 50 bears against a thrust bearing 62 which bears against die spring 56 which is recessed into cavity 64 in spring block 58. Preloading the radial flexures 160 and fine tuning the load to adjust the negative-stiffness effect are both accomplished by turning screw 50. The blocks 52 and 58 are attached to vertical thin-sheet flexures 66 by screws 68. The flexures 66 are attached at their lower ends to base plate 22 using screws 70.

This method of supporting and compressing the radial flexures 160 provides a constant compressive force on the flexures 160 by permitting a softer spring means to load the radial flexures 160 and a softer support structure in the radial direction. As the center hub 20 deflects vertically, the radial flexures 160 shorten in the radial direction thereby reducing the compressive load and the negative-stiffness effect and increasing the vertical stiffness of the isolator and the vertical natural frequency of the system. The softer the elastic structure providing the compressive load, the more constant the compressive load as the center hub deflects away from its equilibrium center position and the smaller the increase in vertical stiffness and vertical natural frequency. In the present configuration, the stiffness of the die spring 56 and the flexures 66 affect the reduction in compressive load as the radial flexures 160 shorten since these elements act in parallel. The flexures 66 are very flexible in the radial direction parallel to the radial flexures but very stiff in the horizontal direction perpendicular to the radial flexures. This method of support constrains the center hub against deflections in directions perpendicular to the radial flexures 160. Two additional thin-sheet shear flexures (not shown) are oriented horizontally and are clamped under the lower radial flexures 160 to the center hub assembly 20 and to blocks (not shown). These blocks are in turn attached to vertical thin-sheet flexures (not shown). The flexures are attached near their bottom ends to the edge of base plate 22. The shear flexures are stiff in directions parallel to the radial flexures 160 and constrain the center hub 20 from displacements it this direction. They are very flexible in bending and, with the high flexibility of the shear flexures in a horizontal direction perpendicular to the shear flexures they add little vertical stiffness to the isolator. Thus, with the system of flexures described that support the radial flexures 160 and connect to the center hub assembly 20 and base plate 22, the center hub assembly 20 is constrained with high stiffness against movement in the horizontal plane.

Figure 6:
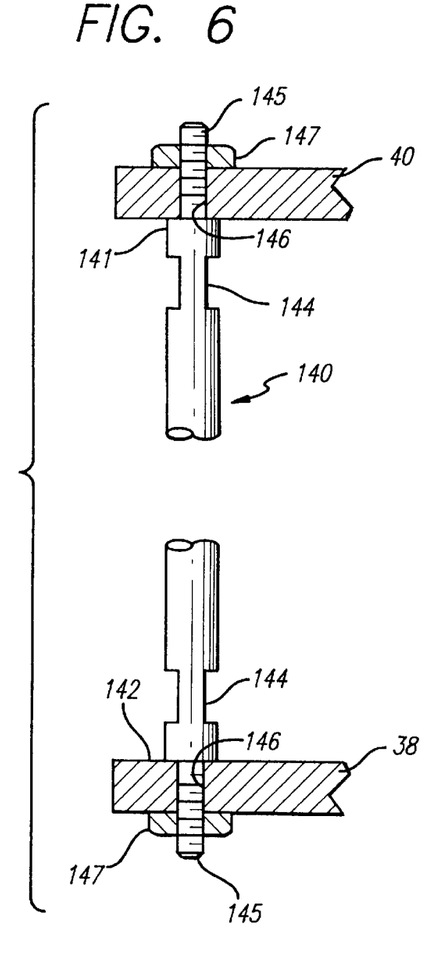
FIG. 6 is a partial cross-sectional elevational view of a notched beam-column embodying features of the present invention.

Referring now to FIG. 6, an alternative embodiment of the notched beam-column in shown and herein described. This particular embodiment of the beam-column 140 includes a first end 141 and second end 142 which are attached to the beam-column plate 38 and upper column-plate 40. Each end of the beam-column 140 includes a notched area 144 which provides the necessary bending stiffness of the beam-column while increasing its local crippling strength as described above. Further modifications to this beam-column 140 include a threaded end 145 which is designed to extend through an opening 146 in the lower column plate 38 and upper column plate 40. Each threaded end can then be secured to the column plate via a nut 147 which holds the beam-column in place. This modification produces a unit which can be manufactured more easily than a unit using a press fit to attach the ends of the beam-column to the end fittings. It should be appreciated that other modifications could be made to this particular design to facilitate the attachment of the beam-column to the upper and lower column plates without departing from the spirit and scope of the present invention.

Figure 7:
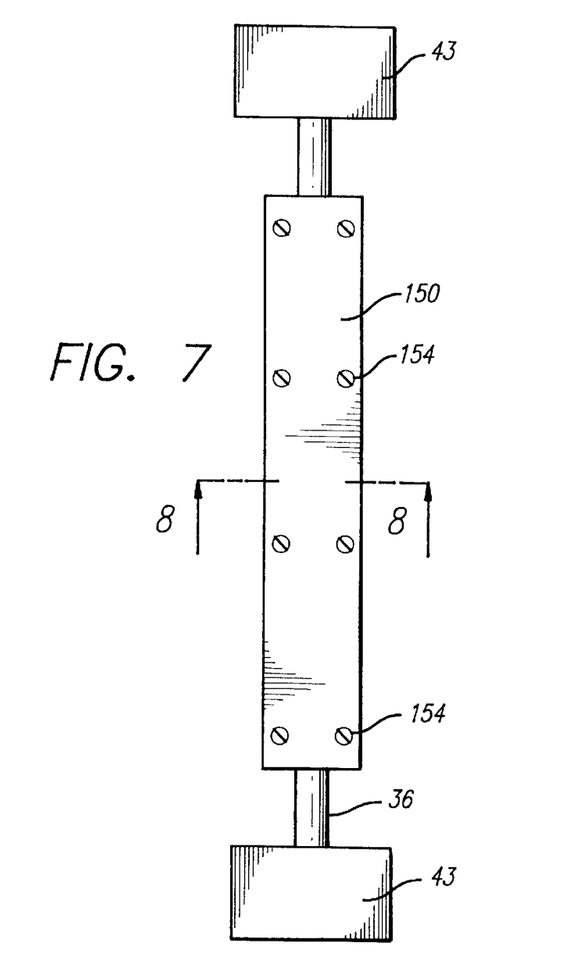
FIG. 7 is an elevational view of an outer stiffening jacket used to stiffen a beam-column embodying features of the present invention.
Figure 8:
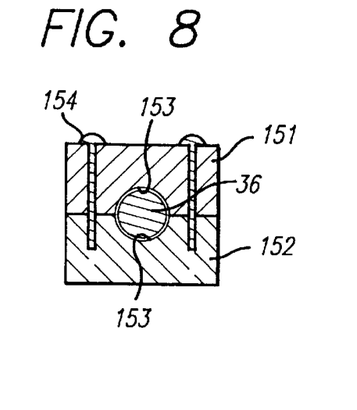
FIG. 8 is a cross-sectional view of the outer stiffening jacket taken along lines 8—8.

Referring now to FIGS. 7 and 8, a further improvement to the design of the beam-columns in shown in which an outer stiffening jacket 150 is utilized to increase the stiffness of the beam-column for certain applications. Such an outer stiffening jacket 150 may be necessary in the event that the initial stiffness of the beam-columns is too low or to provide an easy way of modifying the stiffness for different applications. This provides a simple solution rather than having to remove existing beam-columns to increase the initial stiffness required to carry a supported weight.

This outer stiffening jacket 150 comprises a pair of plate members 151 and 152 which extend over a portion of the beam-column 36. Each plate member 151 and 152 includes a channel 153 which surrounds the beam-column 36 once the two plate members 151 and 152 are joined together. Fastening devices such as screws 154 are used to hold the two plate members 151 and 152 together around the beam-column 36. Other fastening devices such as nuts and bolts could also be used to readily facilitate changing the location of the stiffening jacket on the beam-column 36.

Figure 9:
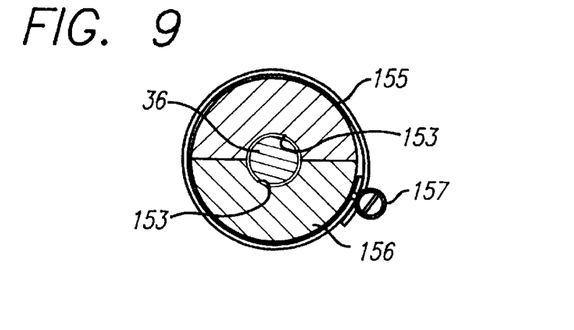
FIG. 9 is a cross-sectional view of another embodiment of an outer stiffening jacket used to stiffen a beam-column embodying features of the present invention.

An alternative embodiment of the outer jacket 150 is shown in FIG. 9 in which the first and second plate members 155 and 156 are circular in configuration as opposed to the rectangular configuration shown in FIG. 8. In such an embodiment, these two plate members 155 and 156 can be maintained together to surround the beam-column 36 by utilizing a plurality of hose-type clamps 157 which are fastened around the two plate members 155 and 156. It should be appreciated that other sizes and configurations of this outer stiffening jacket can also be implemented without departing from the spirit and scope of the present invention. For example, the jacket can be placed so that notches of different lengths are formed at the ends of the beam-column.

Figure 10A:
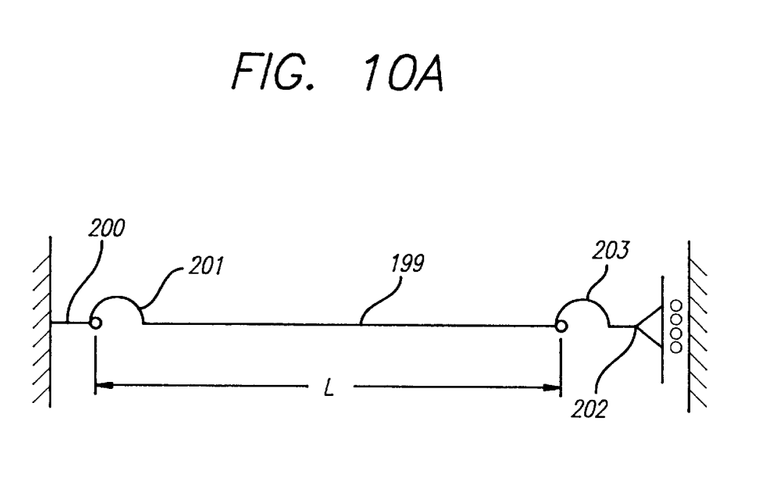
FIG. 10A is a schematic representation of a radial flexure or beam-column for use in the vertical-motion or horizontal-motion isolator.
Figure 10B:
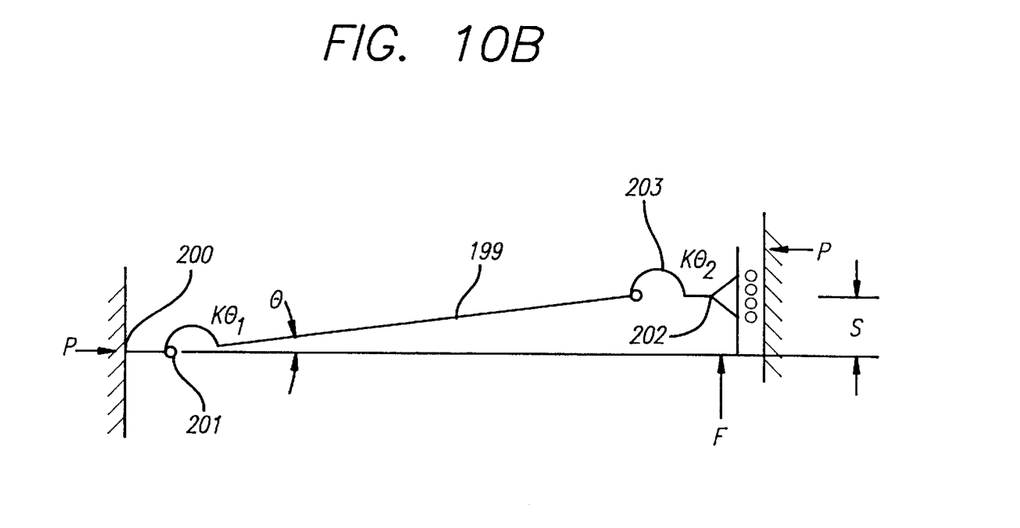
FIG. 10B is the schematic representation of the structure of FIG. 10A with compressive load P and transverse load F applied to the structure.

The foregoing examples represent specific embodiments of a more general structure which can be used in the negative-stiffness mechanism of the vertical-motion isolator or for the beam-columns in the horizontal-motion isolator. Referring to FIGS. 10A and 10B, the structure is represented schematically by a substantially rigid member 199 of length l connected to a first end 200 by a clock spring 201 having rotational stiffness $K_{\theta 1}$ and to a second end 203 by a clock spring having rotational stiffness $K_{\theta 2}$. The end 201 is fixed and the end 202 is movable in a direction transverse to the structure. In FIGURE 10B, the end 202 is shown displaced a distance $\delta$ in response to the force F. Also shown in FIG. 10B is an axial force P that loads the structure in compression. When P is zero, the transverse stiffness of the structure is F÷δ. At some value of $P_C$ (the critical buckling load) the transverse stiffness F÷δ goes to zero, and for values greater than $P_C$, the structure becomes a negative-stiffness mechanism.

The structure shown in FIGS. 10A and 10B can be used for the radial flexures in the vertical-motion isolator or as the beam-columns in the horizontal-motion isolator. Referring to FIG. 1, the structure of FIGS. 10A and 10B could replace radial flexures 160. The fixed end 200 in FIGS. 10A and 10B would represent the ends connected to load block 52 and spring block 58, and the movable end 202 would represent the ends connected to the center hub 20. Similarly, the structure of FIGS. 10A and 10B could replace beam-columns 136. The ends would attach to the lower column plate 38 and the upper column plate 40.

The clock springs of FIGS. 10A and 10B could be actual clock springs, or similar mechanical components, or the rotational stiffness could be provided by other structures such as an elastomeric element, for example, such as those shown in FIG. 6 of U.S. Pat. No. 5,370,352.

The elements making up the present structure, including the outer stiffening, jacket can be made from common structural materials such as steel and aluminum alloys. Other structural materials having suitable strength, elastic and mass properties can also be used.

The damper pad of the tilt motion isolator can be made from various elastomers or rubber like materials to provide a wide range of stiffness and damping. Examples are silicone rubber, Sorbothane® (manufactured by Sorbothane, Inc., Kent, Ohio), Scotchdamp™ Vibration Control Materials such as the ISD-Series manufactured by the 3M Industrial Specialties Division, St. Paul, Minn., and E-A-R Isodamp C-1000 Series Materials (manufactured by E-A-R Division of Cabot Corporation, Indianapolis, Ind.). Stiffness and damping can be varied by changing the particular material, material durometer, pad size and shape (e.g., diameter or square size), pad thickness, etc. Also, multiple pads can be used to vary vertical, horizonal and tilt stiffnesses. If creep is a problem in the isolator, the elastomeric damper pads can also be used with metal springs in parallel to alleviate or help alleviate some of the problems caused by creep.

While one particular form of the invention has been illustrated and described, it will be apparent that various modifications can be made without departing from the spirit and scope of the invention. Accordingly, it is not intended that the invention be limited, except by the attached claims.

What is claimed is:

1. An omnidirectional vibration-isolating suspension apparatus for supporting an object in an equilibrium position relative to a base while suppressing transmission of vibratory motion between the object and the base, comprising:

a vertical-motion isolator for isolating vibratory motion in a vertical direction operatively connected in series with a horizontal-motion isolator for isolating vibratory motion in a horizontal direction and a tilt-motion isolator for isolating tilt motion, said vertical-motion isolator having force-supporting capability in the vertical direction for supporting the object while having relatively high stiffness in any horizontal and rotational direction and relatively low stiffness in the vertical direction;

said horizontal-motion isolator having force-supporting capability in the vertical direction for supporting the object and relatively high stiffness in the vertical direction and low stiffness in any horizontal direction; and said tilt-motion isolator having force-supporting capability in the vertical direction for supporting the object and relatively low tilt stiffness for reducing tilt vibration between the object and the base, said tilt-motion isolator comprising a damper pad made from an energy-absorbing material.

2. The omnidirectional vibration isolating suspension apparatus as defined in claim 1, wherein said tilt-motion isolator comprises a plurality of damper pads adapted to support the object relative to the base.

3. The omnidirectional vibration isolating suspension apparatus as defined in claim 1, wherein said damper pad is made from an elastomeric material.

4. The omnidirectional vibration isolating suspension apparatus as defined in claim 1, wherein the damper pad is made from a rubber-like material.

5. In a vibration isolator having force supporting capability in the direction for supporting an object in an equilibrium position relative to a base while suppressing transmission of vibratory motion between the object and the base, which includes a base platform; spring means having first and second ends for providing positive stiffness in the vertical direction and having force supporting capability in the vertical direction for supporting the object; and means for producing negative stiffness in the vertical direction operatively connected with said spring means, wherein said spring means and said negative stiffness producing means combine to produce low vertical stiffness; the improvement comprising:

a radial flexure forming part of the negative-stiffness-producing means, said radial flexure having a first end and a second end connected to said negative-stiffness-producing means and at least one region along the radial flexure in which the stiffness is less than the stiffness substantially along the length of said radial flexure.

6. The improvement as defined in claim 5, wherein the region of reduced stiffness of said radial flexure comprises a pair of notches which extend into the radial flexure substantially near the first and second ends of said radial flexure.

7. In a horizontal-motion isolator having force supporting capability in the vertical direction for supporting an object in an equilibrium position relative to a base while suppressing transmission of horizontal vibratory motion between the object and the base, which includes a plurality of beam-columns loaded to approach or exceed the beam-column's point of elastic instability, the improvement comprising:

at least one region located along each beam-column in which the stiffness is less than the stiffness substantially along the length of said beam-column.

8. The improvement as defined in claim 7, wherein said region of reduced stiffness comprises a pair of notches which extend into each beam-column substantially near the first and second ends of each beam-column.

9. In a horizontal-motion isolator having force supporting capability in the vertical direction for supporting an object in an equilibrium position relative to a base while suppressing transmission of horizontal vibratory motion between the object and the base, which includes a plurality of beam-columns loaded to approach or exceed the beam-column's point of elastic instability, the improvement comprising:

a mechanism attachable to each of said beam-columns for increasing the initial stiffness of each of said beam-columns.

10. The improvement as defined in claim 9, wherein said mechanism for increasing the stiffness of each beam-column comprises an outer stiffening jacket connectible to each beam-column.

11. A vibration-isolating suspension apparatus for supporting an object in an equilibrium position relative to a base while suppressing transmission of vibratory motion between the object and the base, comprising:

a vertical-motion isolator for isolating vibratory motion in a vertical direction operatively connected in series with a tilt-motion isolator for isolating tilt motion, said vertical-motion isolator having force-supporting capability in the vertical direction for supporting the object while having relatively high stiffness in any horizontal and rotational direction and relatively low stiffness in the vertical direction;

said tilt-motion isolator having force-supporting capability in the vertical direction for supporting the object and relatively low tilt stiffness for reducing tilt vibration between the object and the base, said tilt-motion isolator comprising a damper pad made from an energy-absorbing material.

12. A vibration-isolating suspension apparatus for supporting an object in an equilibrium position relative to a base while suppressing transmission of vibratory motion between the object and the base, comprising:

a horizontall-motion isolator for isolating vibratory motion in a horizontal direction operatively connected in series with a tilt-motion isolator for isolating tilt motion, said horizontal-motion isolator having force-supporting capability in the vertical direction for supporting the object and relatively high stiffness in the vertical direction and low stiffness in any horizontal direction; and said tilt-motion isolator having force-supporting capability in the vertical direction for supporting the object and relatively low tilt stiffness for reducing tilt vibration between the object and the base, said tilt-motion isolator comprising a damper pad made from an energy-absorbing material.

13. In a vibration isolator having force supporting capability in the direction for supporting an object in an equilibrium position relative to a base while suppressing transmission of vibratory motion between the object and the base, which includes a base platform; spring means having first and second ends for providing positive stiffness in the vertical direction and having force supporting capability in the vertical direction for supporting the object; and means for producing negative stiffness in the vertical direction operatively connected with said spring means, wherein said spring means and said negative-stiffness-producing means combine to produce low vertical stiffness; the improvement comprising:

an axially compressed beam-column oriented in a horizontal direction, said compressed beam-column providing some or all of said negative stiffness producing means, wherein the bending flexibility of said beam-column is substantially concentrated near the ends of the beam-column, and the beam-column is relatively stiff in its center region.

14. In a horizontal-motion isolator having force-supporting capability in the vertical direction for supporting an object in an equilibrium position relative to a base while suppressing transmission of horizontal vibratory motion between the object and the base, which includes a plurality of beam-columns loaded to approach or exceed the beam-column's point of elastic instability, the improvement comprising:

the use of beam-columns wherein the bending flexibility of said beam-columns is substantially concentrated near the ends of the beam-columns and the beam-columns are relatively stiff in their center regions.

* * * * *